US012615002B2

(12) United States Patent
Li et al.

(10) Patent No.: US 12,615,002 B2
(45) Date of Patent: Apr. 28, 2026

(54) MOTOR DRIVEN APPLIANCE AND PROTECTION METHOD THEREOF

(71) Applicant: Techtronic Cordless GP, Anderson, SC (US)

(72) Inventors: Yong Min Li, Dongguan (CN); Li Hua Xie, Dongguan (CN); Bao An Zhang, Dongguan (CN); Zong Fen Li, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/245,009

(22) PCT Filed: Sep. 18, 2020

(86) PCT No.: PCT/CN2020/116027
§ 371 (c)(1),
(2) Date: Mar. 13, 2023

(87) PCT Pub. No.: WO2022/056797
PCT Pub. Date: Mar. 24, 2022

(65) Prior Publication Data
US 2023/0336106 A1 Oct. 19, 2023

(51) Int. Cl.
*H02P 29/032* (2016.01)
(52) U.S. Cl.
CPC .................................. *H02P 29/032* (2016.02)
(58) Field of Classification Search
CPC .................................................... H02P 29/032
See application file for complete search history.

(56) References Cited

U.S. PATENT DOCUMENTS 11,472,472 B2 * 10/2022 Koikegami ............ G01R 31/42
2007/0247770 A1 * 10/2007 Ishikawa ................... B60L 3/04
361/42

(Continued)

FOREIGN PATENT DOCUMENTS

CN 101039097 A 9/2007
CN 101604945 A 12/2009

(Continued)

OTHER PUBLICATIONS

Chinese Patent Office Action for Application No. 202080098559.6 dated Oct. 16, 2024 (17 pages including English translation).

(Continued)

*Primary Examiner* — Zoheb S Imtiaz
(74) *Attorney, Agent, or Firm* — Michael Best & Friedrich LLP

(57) ABSTRACT
A motor driven apparatus including a motor, a first switching module and a second switching module on a current path from one terminal of a battery to another terminal of the battery, and a MCU connected to the first and second switching module. The first and second switching module are connected in series to each other, while the first switching module is connected to the motor and adapted to drive the motor. The MCU is adapted to control the first second switching module separately. The MCU is further adapted to, upon its energization, attempt to control the second switching module to be in a cut-off state until the MCU determines that the first switching module is normal. The MCU attempts to detect failures of the switching elements in the first switching module before it enables operation of the motor.

8 Claims, 5 Drawing Sheets

20

(56)     References Cited

U.S. PATENT DOCUMENTS

| | | | |
|---|---|---|---|
| 2013/0314007 A1* | 11/2013 | Yanagihara | H02P 6/28 |
| | | | 318/400.13 |
| 2015/0185287 A1 | 7/2015 | Wang et al. | |
| 2016/0061896 A1* | 3/2016 | Kato | G01R 31/327 |
| | | | 324/415 |
| 2018/0208237 A1* | 7/2018 | Kumagai | H02M 7/48 |
| 2020/0247464 A1* | 8/2020 | Koikegami | H03K 17/0822 |
| 2020/0321902 A1* | 10/2020 | Kozawa | B62D 5/0481 |
| 2022/0120823 A1* | 4/2022 | Nakayama | H02H 3/05 |

FOREIGN PATENT DOCUMENTS

| | | | |
|---|---|---|---|
| CN | 101741311 A | 6/2010 | |
| CN | 101873094 A | 10/2010 | |
| CN | 103782469 A | 5/2014 | |
| CN | 107306127 A | 10/2017 | |
| CN | 110749811 A | 2/2020 | |
| CN | 110829379 A | 2/2020 | |
| EP | 3264590 A1 | 1/2018 | |
| JP | 2013198368 A | * | 9/2013 |
| JP | 2013241162 A | 12/2013 | |
| WO | 0161818 A1 | 8/2001 | |

OTHER PUBLICATIONS

Chinese Patent Office Action for Application No. 202080098559.6 dated May 12, 2025 (18 pages including English translation).
Mexican Patent Office Action for Application No. MX/a/2023/ 002716 dated Aug. 26, 2025 (6 pages including statement of relevance).
Extended European Search Report for Application No. 20953655.6 dated May 17, 2024 (7 pages).

* cited by examiner

MOTOR DRIVEN APPLIANCE AND PROTECTION METHOD THEREOF

FIELD OF INVENTION

This invention relates to motor driven appliances, and in particular to protection of the motor from damages caused by failures in a driving circuit of the motor.

BACKGROUND OF INVENTION

Various motor driven appliances (such as, for example, electrical vehicles, electric power tools and electric working machines) are known that contain a switching module and a motor, where the switching module enables or disables a current from supplying to the motor depending on whether an output of the motor is required. Some switching modules take the simple form of a user-actuated mechanical switch, while others may be in the form of a multi-phase motor driving circuit for brushless motors. Often, it is desired to have a protection function for the motor and other components in the circuit of the motor driven appliance, because the switching module may be damaged or otherwise malfunctioning, which could accidently starts the motor to cause harms to the operator, and even damages the motor or other components in the circuit because of the high current incurred by short-circuiting.

There have been many different protection mechanisms developed to provide additional circuitry for the motor and other components, in case the switching module is not working properly. Examples of the protection mechanisms include configuring two identical sets of driving circuits for one brushless motor so that in case one set fails, the other set can be used in place. Other examples include failure detection circuits for the switching modules for each of the multiple phases of the motor. However, the conventional protection mechanism are often very complicated in circuit structures which lead to additional cost and also is prone to failure in the protection mechanism itself.

SUMMARY OF INVENTION

Accordingly, the present invention, in one aspect, is a motor driven appliance including a motor, a first switching module and a second switching module that are provided on a current path from one terminal of an energy source to another terminal of the energy source, and a control unit connected to the first switching module and the second switching module. The first and second switching modules are connected in series to each other, while the first switching module is connected to the motor and adapted to drive the motor. The control unit is adapted to control the first switching module and the second switching module separately. The control unit is further adapted to, upon its energization, attempt to control the second switching module to be in a cut-off state until the control unit determines that the first switching module is normal.

In some embodiments, the motor is a brushless motor with N phases, and the first switching module contains an arm for each one of the N phases. Each arm of the first switching module contains a high-side switching element and a low-side switching element. Each arm is connected to a respective one of the N phases of the motor at a point between the high-side switching element and the low-side switching element of the arm.

In some embodiments, the control unit is adapted to determine that the first switching module is normal, by measuring a single divided voltage within the first switching module.

In some embodiments, the motor driven appliance further includes a detector circuit connected to the first switching module. The detector circuit contains a plurality of resistors and is adapted to output the divided voltage. The control unit is adapted to determine if any one of the high-side switching elements and low side switching elements in the first switching module is short-circuited, by comparing the divided voltage with fractions of a source voltage fed to the first switching module. The fractions of the source voltage are determined by the plurality of resistors.

In some embodiments, the control unit is further adapted to determine if a cut-off switching element in the second switching module is short-circuited, by comparing the divided voltage with the fractions of the source voltage.

In some embodiments, the second switching module further contains a first switching element located in the current path, and a second switching element connected to the first switching element. The second switching element is adapted to receive signals from the control unit to change its switching state, so as to control the first switching element to be in the cut-off state or a conducting state.

In some embodiments, both the first and second switching elements are transistors. The second switching element is connected to a control terminal of the first switching element.

In some embodiments, the control unit upon its energization applies a cut-off signal to the second switching element to put the first switching element in the cut-off state, until the control units determines that the first switching module and the first switching element are normal.

In some embodiments, the control unit is further adapted to, upon its energization, attempt to control the second switching module to be in a cut-off state until the control unit determines that both the first switching module and the second switching module are normal.

Another aspect of the invention provides a protection method of a motor driven appliance that includes a motor and a control unit. The method includes energizing the control unit; placing a second switching module, by the control unit, into a cut-off state; determining, by the control unit, if a first switching module on the current path and adapted to drive the motor is normal; and removing the cut-off state of the second switching module if the control unit finds that the first switching module is normal. The second switching module is on a current path that goes through the motor.

In some embodiments, the determining by the control unit before removing the cut-off state of the second switching module, also includes determining if the second switching module is normal.

Embodiments of the invention therefore provide a simple yet highly reliable failure detection circuitry for the switching module of a motor. In the example of motor driving circuit for a brushless motor that contains six high-side and low-side MOSFETs, the Microcontroller Unit (MCU) would know if any one of the six MOSFET, as well as the MOSFET in the cut-off circuit, is shorted and thus malfunctioning. Such a determination takes place as soon as the MCU is energized and before the MCU sends any driving signals to the motor driving circuit, therefore the motor will not be subject to any short-circuit hazard as the failure detection processes is completed at an early stage. In addition, all components in the detector circuit are resistors which minimize the chances that the detector circuit itself fails. Any failure in the cut-off circuit (i.e. the cut-off MOSFET) can also be detected by the MCU concurrently as mentioned above. The protection mechanisms provided in the embodiments are therefore low-cost, and also not prone to failures.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

In the drawings, like numerals indicate like parts throughout the several embodiments described herein.

DETAILED DESCRIPTION

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Figure 1:
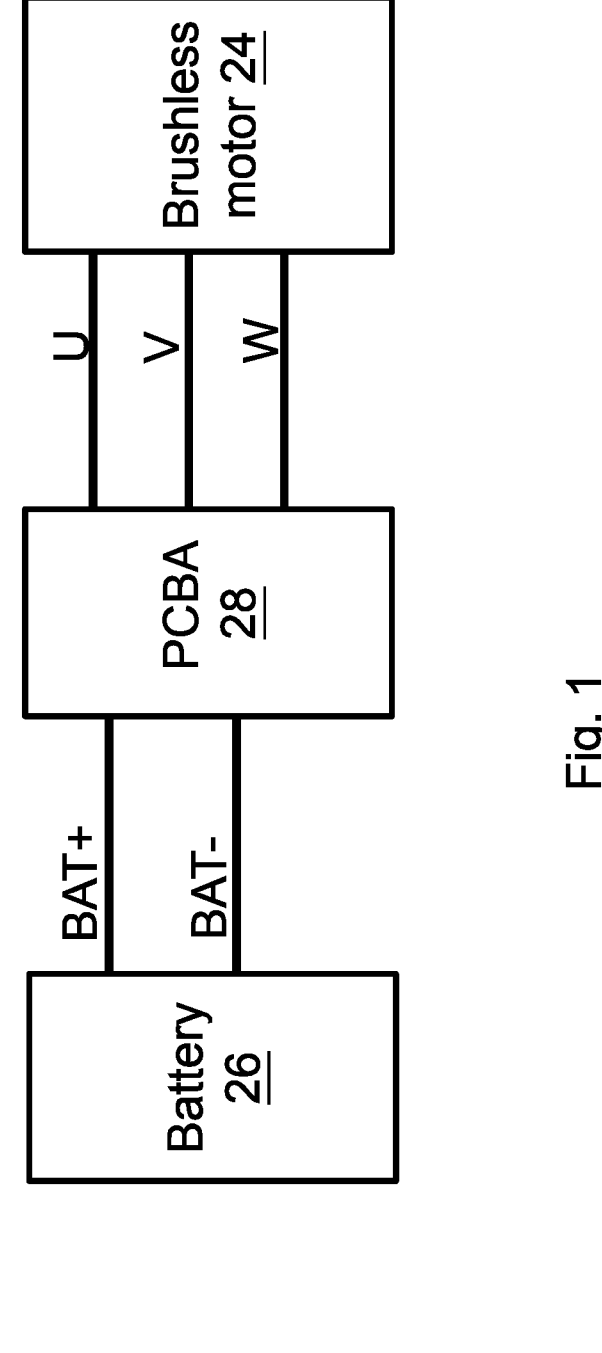
FIG. 1 is a schematic diagram showing the electrical circuit in a motor driven apparatus according to a first embodiment of the invention.

Referring now to FIG. 1, the first embodiment of the present invention is a motor driven apparatus 20, which can be in the form of a portable electric power tool, a house appliance, an electric vehicle, etc. It should be noted that the form factor or the end effect of the motor driven apparatus is not relevant to the embodiment as the embodiment is about the protection to the motor. The motor driven apparatus 20 contains a battery 26 as an energy source, which for example could be a removable battery pack, a built-in fuel cell, a dry battery, etc. It should be noted that although the battery 26 is depicted as a single component in the block diagram of FIG. 1, it could also contain multiple energy storage means as exemplified above that are stacked. The battery 26 has two outputs BAT+ and BAT− connected to a PCBA 28 (Printed Circuit Board Assembly), where the PCBA 28 contains at least a controller, and switching modules for a brushless motor 24 connected to the PCBA 28. It should be noted that although the PCBA 28 is depicted as a single component in FIG. 1, it may consist of two or more separate PCBAs in the motor driven apparatus 20 with multiple function blocks of the circuit of the apparatus 20 distributed on the separate PCBAs. There may be other components of the apparatus 20 like a housing, a work element that is driven by the motor, user input devices, etc. which are not relevant to the embodiment and are thus not shown in FIG. 1.

One can see from FIG. 1 that the battery 26 outputs a direct current (DC) electrical power to the PCBA 28, which means that a current path is established from one terminal of the battery 26 (i.e. BAT+) to another terminal of the battery 26 (i.e. BAT−). The brushless motor 24 as well as any other electrical component of the apparatus 20 is located in the current path, however a motor driving circuit on the PCBA 28 is required to transform the DC electricity from the battery 26 to a frequency-controlled three-phase output (designated by U, V and W) for the motor 24. The motor driving circuit and its protection mechanism will be described in more details below.

Figure 2:
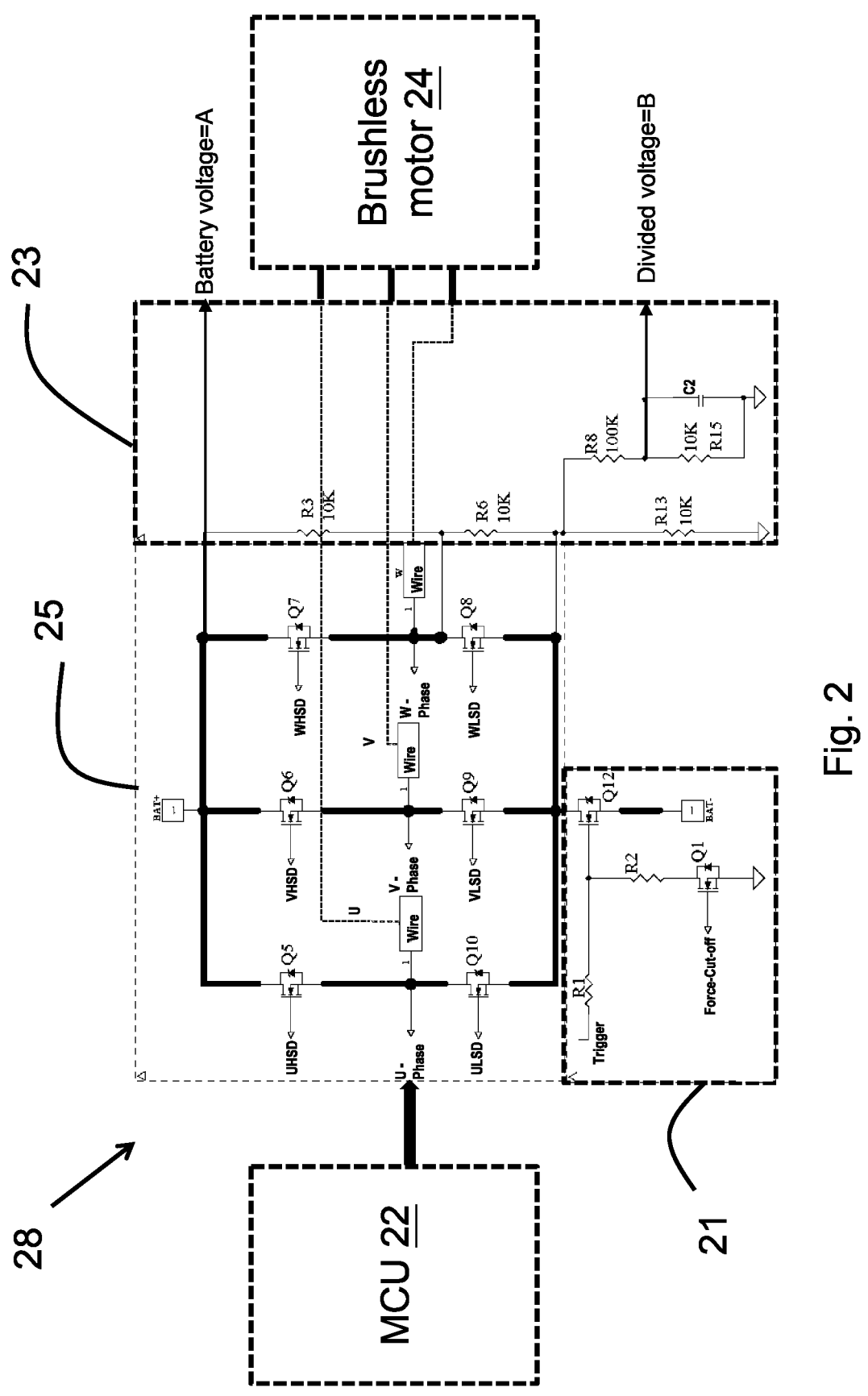
FIG. 2 shows the motor driving circuit and the failure protection mechanism in the motor driven apparatus of FIG. 1.

Turning now to FIG. 2 which shows the schematic diagram of the PCBA 28 including the control circuit for the brushless motor 24 and its protection mechanism. The MCU 22 which acts as a control unit of the motor driven apparatus 20 connects to a motor driving circuit 25, a cut-off circuit 21, and a detector circuit 23. The MCU 22 is adapted to control the motor driving circuit 25 and the cut-off circuit 21 separately. The motor driving circuit 25 is a first switching module in this embodiment, and the cut-off circuit 21 is a second switching module in this embodiment. The MCU 22, the cut-off circuit 21 and the detector circuit 23 together form the protection mechanism for the motor 24. The MCU 22 is powered by the battery 26 through a power supply circuit (not shown) separate from the motor driving circuit 25.

The motor driving circuit 25 takes a conventional form of six MOSFETs Q5-Q10, as skilled persons in the art understand. There are three arms in the motor driving circuit 25 corresponding to the three phases U, V and W of the motor 24 respectively. On each arm, there is a pair of high-side MOSFET (Q6, Q7 or Q5) and a low-side MOSFET (Q9, Q8 or Q10). At a point between the high-side MOSFET (e.g. Q5) and the low-side MOSFET (e.g. Q10) in an arm, there is a wire connected to a respective phase of the motor 24. The N-channel MOSFETs Q5-Q10 are switching elements in the motor driving circuit 25 with their gates connected to the MCU 22, as indicated by the labels UHSD, ULSD, VHSD, VLSD, WHSD, WLSD in FIG. 2. The drains of the high-side MOSFETs Q5-Q7 are connected to the battery terminal BAT+, and their sources connected to the low-side MOSFETs Q8-Q10. As the skilled person understand, rotation of the motor 24 is controlled by the MCU 22 using a six-step commutation technique (sometimes called 60, 120 degree control). The six-step technique creates a voltage system with six vectors over one electronic rotation, with the knowledge of real-time rotor position by using Hall sensors (not shown).

Connected to the motor driving circuit 25 is the detector circuit 23 which is to extract a single, divided voltage B for the MCU 22 to determine possible failure(s) in any one of the MOSFETs Q5-Q10, as well as a MOSFET Q12 in the cut-off circuit 21. The detector circuit 23 contains two outputs connected to the MCU 22 via suitable voltage sensing means (not shown), namely a battery voltage A that is a source voltage at the input of the motor driving circuit 25, and the divided voltage B. The divided voltage B is so called because it is resulted from a voltage divider circuit in the detector circuit 23 that consists of multiple resistors R3, R6, R8, R13 and R15. The divided voltage B is the only divided voltage to be measured, and if all seven MOSFETs Q5-Q10 and Q12 are normal B should be a fixed fraction value of the battery voltage A. However, if one or more of the MOSFETs is shorted, then depending on the location of the failed MOSFET(s), one or more of the resistors mentioned above will be bypassed because of the short-circuit, so the measured, actual voltage B will differ from the fixed fraction value mentioned above. In the embodiment of FIG. 2, the four resistors R3, R6, R15 and R13 have identical resistance values. There is a capacitor C2 connected in parallel with the resistor R15 between R8 and common ground. The capacitor C2 is used for as a voltage filter for the divided voltage B.

Turning to the cut-off circuit 21, one can see that it is connected in series with the motor driving circuit 25 in the current path from BAT+ to BAT−. The cut-off circuit 21 is intended to cut off the current path when necessary so that even if the motor driving circuit 25 is short-circuited or otherwise malfunctioning, no power is supplied to the motor 24 so as to prevent damages caused to the motor 24. The cut-off circuit 21 contains an trigger input connected to a trigger (not shown) of the motor driven apparatus 20, where the trigger input is connected to the gate of a cut-off switching element (MOSFET Q12) via a resistor R1. The trigger input would make Q12 always cut off when the user is not pressing a trigger (not shown) of the motor driven apparatus 20 as the trigger when closed supplies a gate driven current to Q12 in order to turn on the same. On the other hand, before Q12 the trigger input is connected also to another MOSFET Q1 that is controlled by the MCU 22 through a force_cut-off pin connected to the control terminal (which is the gate) of Q1. Q1 is connected on the other side (via its source) to the common ground. During normal operation of the motor driven apparatus, the MCU 22 does not provide a force_cut-off signal to the force_cut-off pin, so Q1 is not conducting, and any gate driven signal to Q12 will drive Q12 into its conducting state as a result of the user pressing the trigger. However, if the MCU 22 outputs the force_cut-off signal to the force_cut-off pin connected to the gate of Q1, then current flowing through R1 bypasses the gate of Q12 and flows to ground through R2 and Q1. Accordingly, Q12 is turned OFF (non-conducting) regardless of whether the tool trigger is activated.

Now turning to the operation of the failure detection and motor protection mechanism described above, FIG. 3 shows how the MCU 22 determines the possible failures of the MOSFETs Q5-Q10 in the motor driving circuit 25 and Q12 in the cut-off circuit 21 prior to enabling the motor 24 to operate. The method starts at Step 30 in which the user presses the trigger of the motor driven apparatus 20 when he/she wants to turn on the motor driven apparatus 20. As soon as the trigger is pressed down, in Step 31 the MCU 22 is energized and goes into operation via its power supply circuit connected to the battery 26. However, the MCU 22 when it is energized does not immediately turns on the motor 24 and in particular the MCU 22 does not send out driven signals to Q5-Q10 in the motor driving circuit 25 at this stage. Rather, the MCU 22 firstly applies the force_cut-off signal to Q1 in the cut-off circuit 21. With the force_cut-off signal in place, Q1 becomes conducting while the user is pressing also the trigger, so the gate driven current from the trigger is not conveyed to Q12, making Q12 non-conducting. In this way, no current can flow to the BAT− from BAT+ in addition to no driven signals being provided to Q5-Q10, so the motor 24 cannot start in any event.

After the force_cut-off signal is applied to Q1, the MCU 22 then attempts to determine any potential failure among Q5-Q10 and Q12. The MCU 22 in Step 34 firstly reads the battery voltage at BAT+, which is the source voltage A. As mentioned above, there is no direct coupling of the source voltage A to the MCU 22 because its magnitude may be too large for the MCU 22. Rather, the source voltage A (same for the divided voltage B) is downscaled by a voltage sensing means to a range acceptable to the MCU 22. Then, the MCU 22 in Step 35 checks for the magnitude of divided voltage B. In Step 36 the MCU 22 determines if B=0. If yes, then the methods goes to Step 43 in which the MCU 22 determines that Q12 is short, and then the method ends at Step 44 since at least one of the critical MOSFETs is abnormal, and the motor driven apparatus 20 cannot be started until the failed component is replaced by the user.

If in Step 36 the MCU 22 finds that the divided voltage B does not equal to zero, then the method proceeds to Step 37 in which the MCU 22 determines if B=0.03A. If yes, then the MCU 22 in Step 40 determines that all the critical MOSFETs Q5-Q10 and Q12 are normal so the motor driven apparatus 20 can be started. The fraction of 0.03A is therefore the above-mentioned fixed fraction value indicating normal of the motor driving circuit 25. If in Step 37 it is found that B does not equal to 0.03A, then the method proceeds to Step 38 in which the MCU 22 determines if B=0.045A. If yes, this means that at least one of the high-side MOSFETs is short, or at least one of the low-side MOSFETs is short, but not both a high-side MOSFET and a low-side MOSFET are short at the same time, and in sequence the MCU 22 determines in Step 41 the failure on only one of the high side and the low side. On the other hand, if both a high-side MOSFET and a low-side MOSFET are short at the same time, then B will not be equal to 0.045A (and the method goes to Step 39), but B will be equal to 0.09A, and in sequence the MCU 22 determines in Step 42 the failures both on the high side and on the low side. No matter whether the failure occurs on one or both of the high and low sides, the method from Steps 41 and 42 goes to Step 44 described above.

Figure 3:
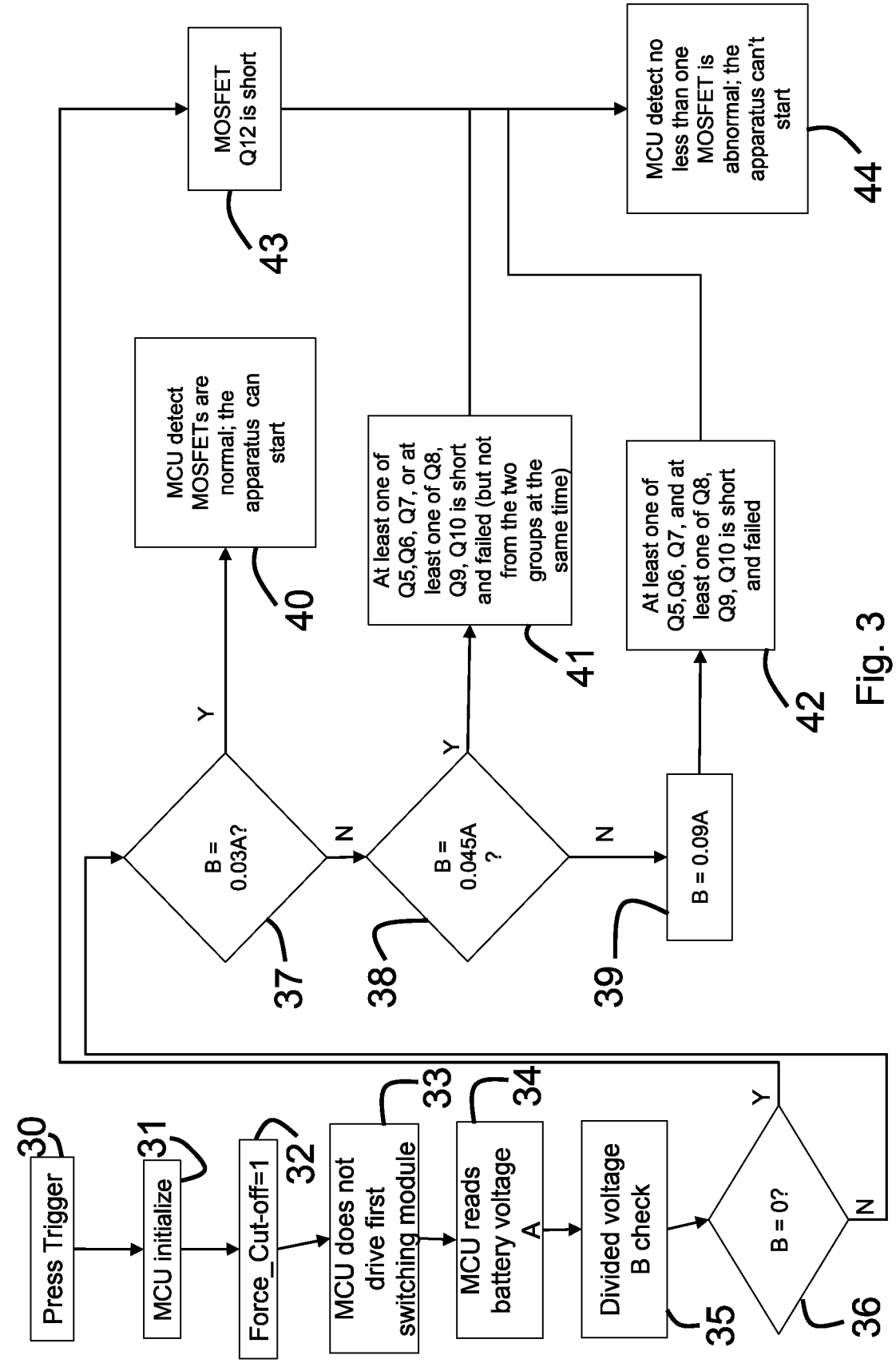
FIG. 3 is a flowchart showing the processes of the MCU determines failures in MOSFETs in the motor driving circuit of the motor driven apparatus of FIG. 1.

In summary, for the method in FIG. 3, the MCU 22 applies the following formula to calculate an intended value (i.e. the fixed fraction value) of B based on the resistor values shown in FIG. 2, that is B should be equal to 0.03A if everything is normal. However, if any one of Q5, Q6, and Q7 is short, then the effective value of R3 in the formula becomes zero. Likewise, if any one of Q8, Q9, and Q10 is short, then the effective value of R6 in the formula becomes zero. If Q12 in the cut-off circuit 21 is short, then the effective value of R13 in the formula becomes zero. All of the above will lead to the actual value of B being different from 0.03A, such as those fractions of 0.045A and 0.09A shown in Steps 38 and 39. Then MCU 22 compares the actual magnitude of divided voltage B with the different fractions to determine where the failure occurs in the circuit.

$$B = \frac{R15}{R15 + R8} * \frac{R13}{R13 + R6 + R3} * A$$

From the above, one can see that the method in the embodiment provides a robust mechanism of detecting failures of the critical MOSFETs and will provide the motor with the protection that no driven signal is provided thereto, and no cut-off at Q12 is removed, until all the critical MOSFETs are found normal. If one of these MOSFETs is not normal, the motor driven apparatus cannot be started, and the user needs to replace the defected component. In the next starting attempt, the above-described method will execute again, ensuring that all the MOSFETs are in good condition. It should be also noted that although not shown in the flow chart, the MOSFET Q1's failure, if any, is also implicitly captured by the method in FIG. 3 because if Q1 is short, then no matter whether there is any force_cut-off signal from the MCU 22 (i.e. when the MCU 22 "attempts" to place the cut-off circuit 21 in the cut-off condition), Q1 will always be conducting, thus maintain the cut-off status of Q12 and protects the motor 24.

Figure 4:
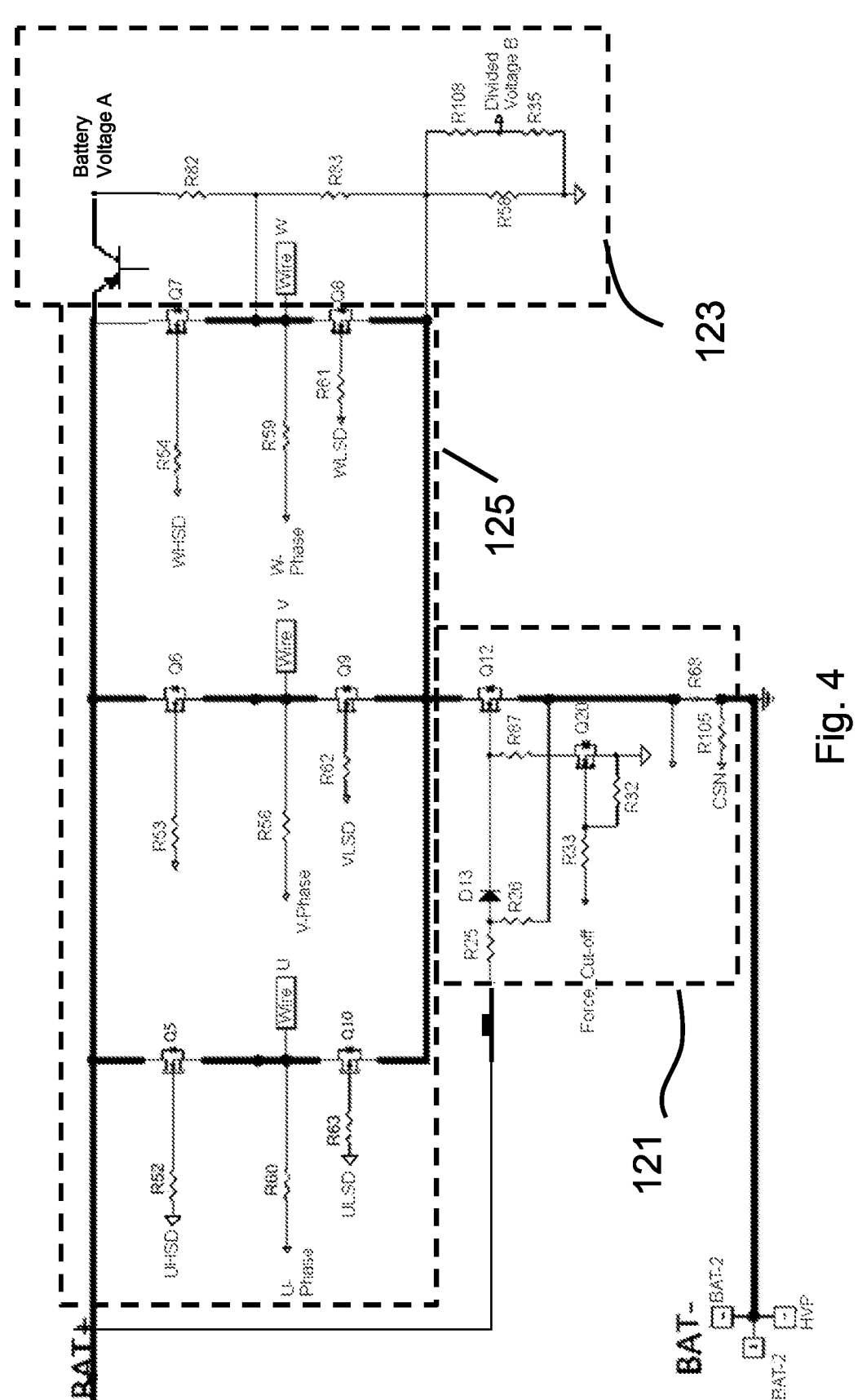
FIG. 4 shows the motor driving circuit and the failure protection mechanism in a motor driven apparatus according to another embodiment of the invention.
Figure 5:
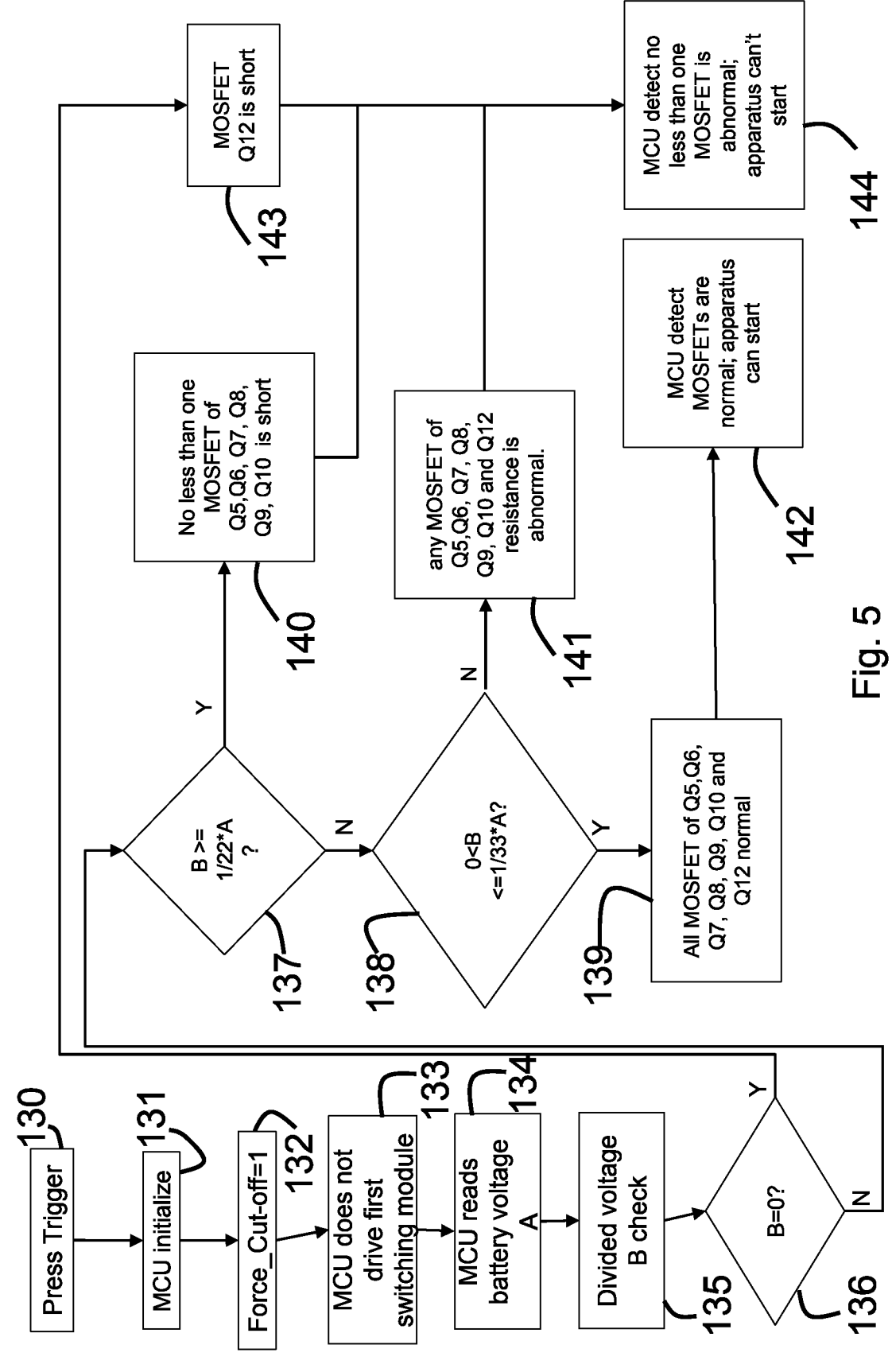
FIG. 5 is a flowchart showing the processes of the MCU determines failures in MOSFETs in the motor driving circuit of the motor driven apparatus of FIG. 4.

Turning to FIGS. 4-5, in another embodiment of the invention the schematic diagram of the PCBA and the method of operation of the failure detection and motor protection mechanism will be described. For the sake of brevity, only differences in the embodiment in FIGS. 4-5 as compared to that of FIGS. 2-3 will be described in the following sections. The circuit in FIG. 4 also has a motor driving circuit 125, a MCU (not shown), a cut-off circuit 121, and a detector circuit 123, with their inter-connections similar to that in FIG. 2. However, there are slight differences in the circuitry within the cut-off circuit 121 and the detector circuit 123 as compared to their counterparts in FIG. 2. In the cut-off circuit 121 there is a diode D13 and a resistor 26 connected in parallel between the trigger input and Q12, which helps protect Q12 from reversed currents. Also, there are additional resistors R33 and R32 connected to the gate and the source of the other MOSFET Q20 in the cut-off circuit 121 now. In the detector circuit 123, the main difference as compared to that in FIG. 2 is that there is no capacitor for filtering the divided voltage B.

FIG. 5 shows the operation method of the failure detection and motor protection mechanism for the circuit in FIG. 4. All Steps 130-136 in FIG. 5 are basically the same as their counterparts in FIG. 3 and will not be introduced again herein. The differences start to appear since Step 137, where in the method of FIG. 5, different fractions of the source voltage A are used as the basis for detecting failures of the MOSFETs. In Step 137, the MCU first determines if B is equal to or larger than $\frac{1}{22}*A$, if yes, then the MCU determines in Step 140 that at least one of Q5-Q10 is short. The method ends at Step 144 since at least one of the critical MOSFETs is abnormal, and the motor driven apparatus cannot be started until the failed component is replaced by the user.

If in Step 137 the MCU finds that the divided voltage B is lower than $\frac{1}{22}*A$, then the method goes to Step 138 in which the MCU determines if B is between zero and $\frac{1}{33}*A$. If yes, this means that at least one of the MOSFETs Q5-Q10 is short, and in sequence the MCU determines in Step 141 determines such a failure. The method then goes to Step 144 mentioned above. On the other hand, if all of the MOSFETs Q5-Q10 and Q12 are normal, then the check result in Step 138 will be true, and the method goes to Step 139 in which the MCU determines the normal case, so the motor driven apparatus can be started in Step 142.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

For example, in the embodiments of FIG. 1 a battery is shown as the energy source for the motor driven apparatus, but one skilled in the art should realize that other types of energy sources can also be used such as mains electricity, a generator, a solar panel, etc. Similarly, although a brushless motor is shown in the embodiments described above, other types of motors like AC motors or DC brushed motor may also be applied with the protection mechanism of the invention. The number of phases of the brushless motor can also be different from three, as it can generalized as N phases where N is larger than 1.

It should be noted that the circuit structures of the detector circuit and the cut-off circuit shown in FIGS. 2 and 4 are not intended to be limiting, as other types of circuitries can also be used for the same purposes, as long as the overall circuit is design to fulfil the purpose of the invention, i.e. to apply a cut-off condition to the motor current path initially until all switching elements are found to be normal.

Various embodiments of the invention may provide protections to motors, as well as any other electric components located in the main circuit path, from being damaged by the large current incurred by short-circuiting of one or more of switching elements. In particular, other electric components beside motor for example include other types of energy-consuming components (i.e. loading) such as light illuminating devices, sound devices, and display screens. Power supply devices like batteries and power converter may also be protected from being damaged according to embodiments of the invention.

The invention claimed is:

1. A motor driven appliance comprising:
   a) a motor;
   b) a first switching module and a second switching module that are provided on a current path from one terminal of an energy source to another terminal of the energy source, and are connected in series to each other; the first switching module connected to the motor and adapted to drive the motor, the second switching module connected to a user-input; and
   c) a control unit connected to the first switching module and the second switching module; the control unit adapted to control the first switching module and the second switching module separately;
      wherein the control unit is further adapted to, upon its energization, control the second switching module to be in a cut-off state until the control unit determines that the first switching module is normal and that the second switching module is normal, and wherein the second switching module remains in the cut-off state unless the user-input is activated;

wherein the control unit is further adapted to determine if the first switching module and the second switching module are normal based on a voltage of the energy source and a divided voltage; and wherein the control unit is further adapted to determine if a cut-off switching element in the second switching module is short-circuited, by comparing the divided voltage with a fraction of the voltage the energy source.

2. The motor driven appliance according to claim 1, wherein the motor is a brushless motor with N phases, and the first switching module comprises an arm for each one of the N phases; each arm of the first switching module comprising a high-side switching element and a low-side switching element; each arm being connected to a respective one of the N phases of the motor at a point between the high-side switching element and the low-side switching element of the arm.

3. The motor driven appliance according to claim 1, further comprises a detector circuit connected to the first switching module; the detector circuit comprising a plurality of resistors and being adapted to output the divided voltage; wherein the control unit is adapted to determine if any one of a high-side switching elements and low side switching elements in the first switching module is short-circuited, by comparing the divided voltage with a fraction of the voltage of the energy source fed to the first switching module, where the a fraction of the voltage of the energy source are determined by the plurality of resistors.

4. The motor driven appliance according to claim 1, wherein the second switching module further comprises a first switching element located in the current path, and a second switching element connected to the first switching element; the second switching element adapted to receive signals from the control unit to change its switching state, so as to control the first switching element to be in the cut-off state or a conducting state.

5. The motor driven appliance according to claim 4, wherein both the first and second switching elements are transistors, the second switching element connected to a control terminal of the first switching element.

6. The motor driven appliance according to claim 5, wherein the control unit upon its energization applies a cut-off signal to the second switching element to put the first switching element in the cut-off state, until the control units determines that the first switching module and the first switching element are normal.

7. The motor driven appliance according to claim 1, wherein the control unit is further adapted to, upon its energization, attempt to control the second switching module to be in a cut-off state until the control unit determines that both the first switching module and the second switching module are normal.

8. A protection method of a motor driven appliance comprising a motor and a control unit, the method comprises:

a) energizing the control unit;

b) placing a second switching module, by the control unit, into a cut-off state; the second switching module on a current path that goes through the motor;

c) determining if a user-input has been activated;

d) determining, by the control unit, if a first switching module on the current path and adapted to drive the motor is normal;

e) removing the cut-off state of the second switching module if the control unit finds that the first switching module is normal, that the second switching module is normal, and the user-input has been activated; and f) determining if the first switching module and the second switching module are normal based on a voltage of an energy source and a divided voltage;

g) determining if a cut-off switching element in the second switching module is short-circuited, by comparing the divided voltage with a fraction of the voltage the energy source.

* * * * *